May 8, 1945.  F. G. CREED  2,375,286
FLOATING STRUCTURE FOR SALVAGING SUNKEN VESSELS AND OTHER USES
Filed July 11, 1944   5 Sheets-Sheet 1
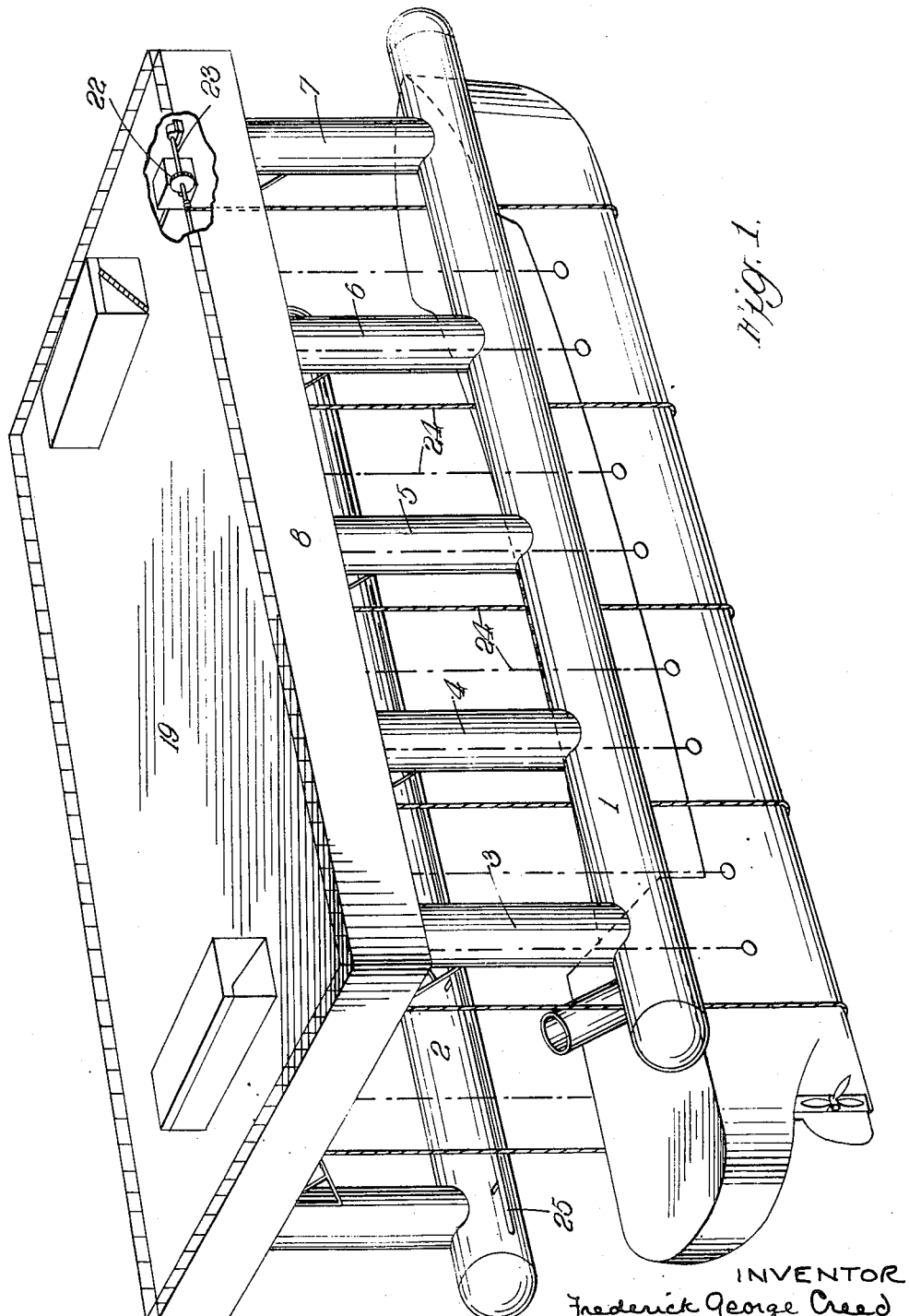

May 8, 1945. F. G. CREED 2,375,286
FLOATING STRUCTURE FOR SALVAGING SUNKEN VESSELS AND OTHER USES
Filed July 11, 1944 5 Sheets-Sheet 2
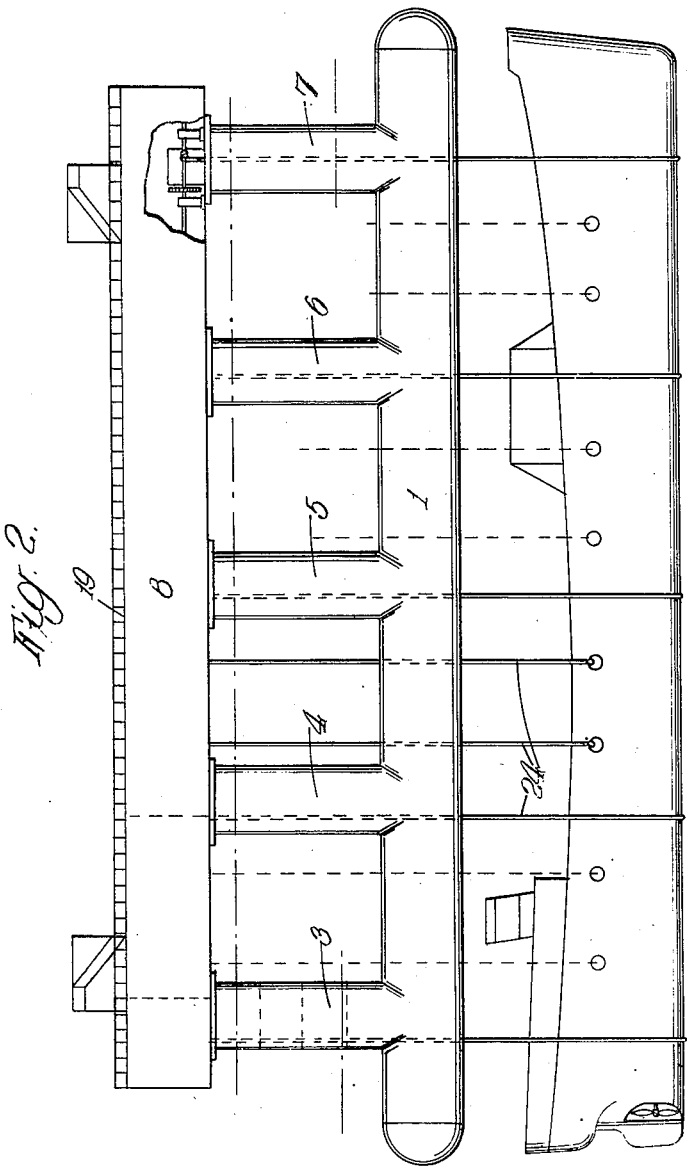
INVENTOR
Frederick George Creed
By Otto Munk
his ATTY.

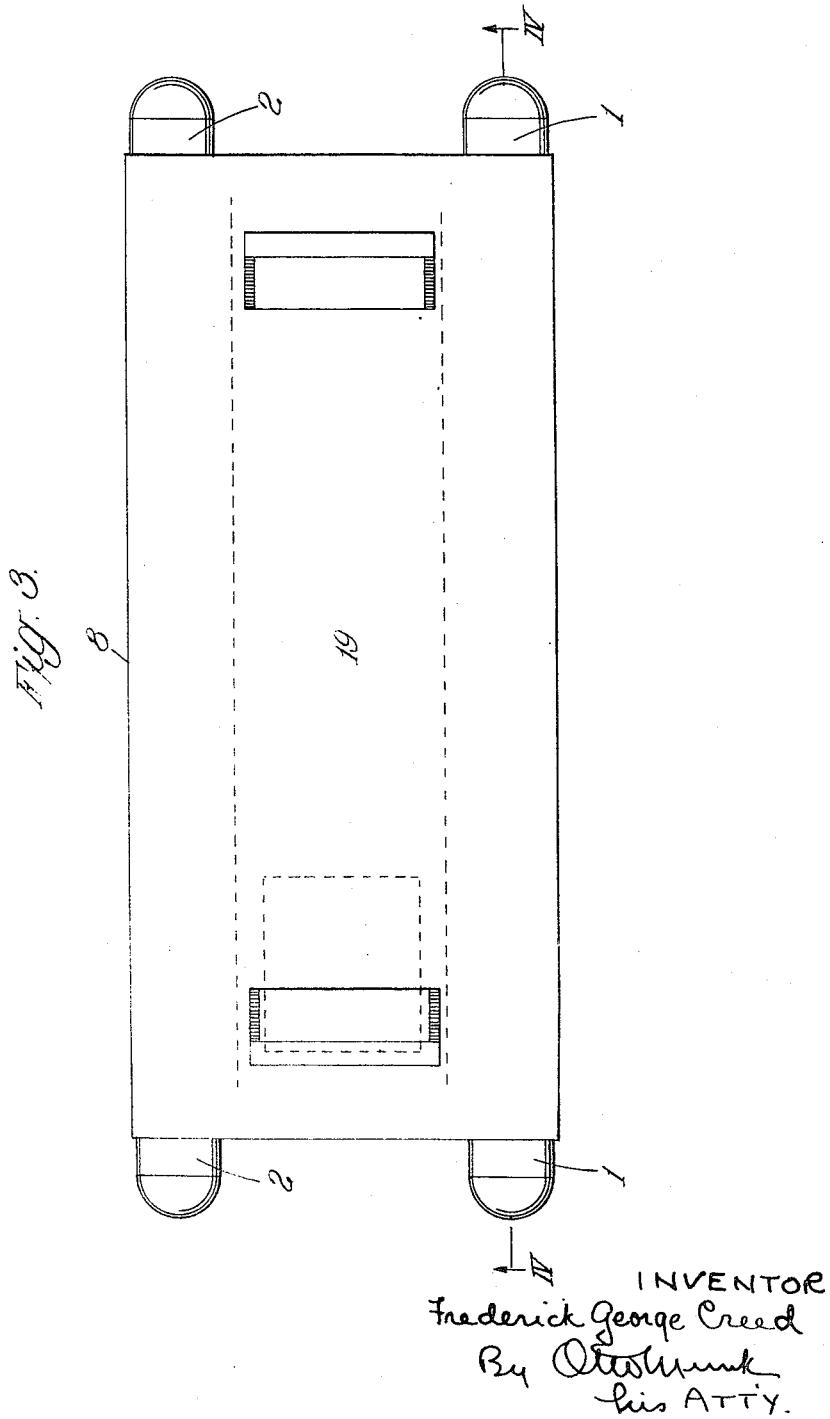

May 8, 1945. F. G. CREED 2,375,286
FLOATING STRUCTURE FOR SALVAGING SUNKEN VESSELS AND OTHER USES
Filed July 11, 1944 5 Sheets-Sheet 4
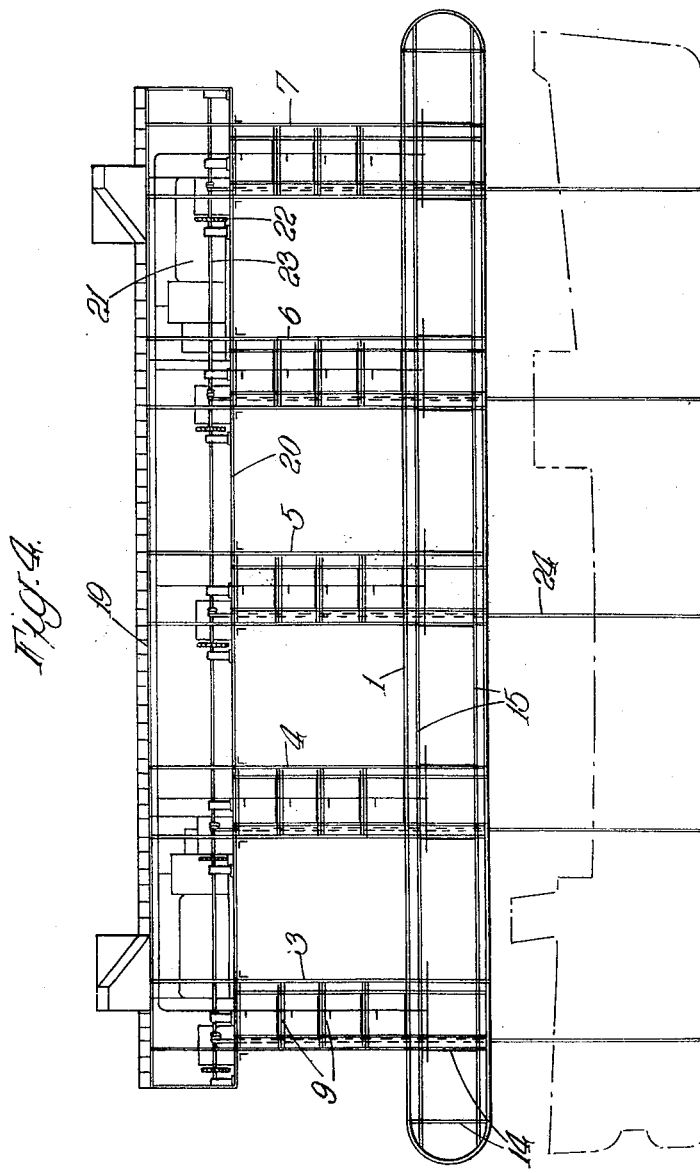
INVENTOR
Frederick George Creed
By [signature]
his ATTY.

May 8, 1945. F. G. CREED 2,375,286
FLOATING STRUCTURE FOR SALVAGING SUNKEN VESSELS AND OTHER USES
Filed July 11, 1944 5 Sheets-Sheet 5
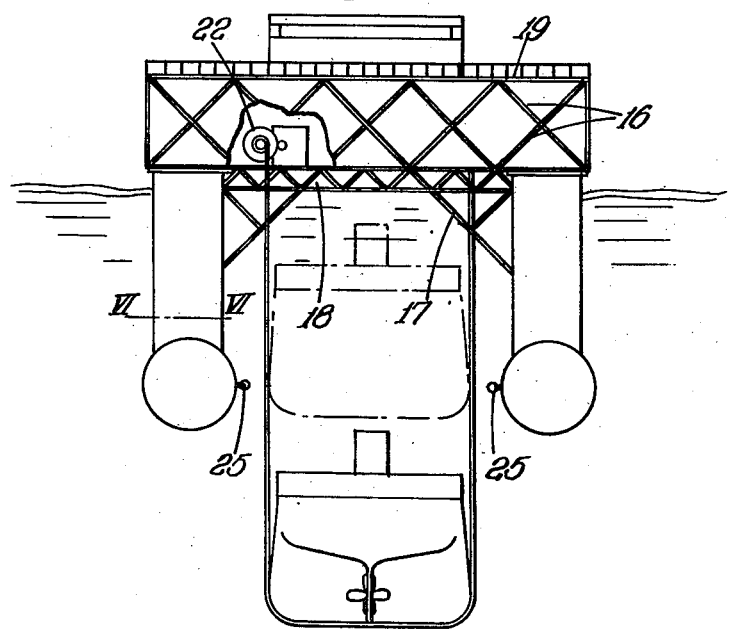
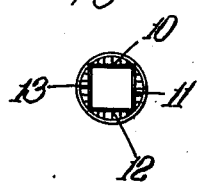   
INVENTOR
Frederick George Creed

UNITED STATES PATENT OFFICE 2,375,286

FLOATING STRUCTURE FOR SALVAGING SUNKEN VESSELS AND OTHER USES

Frederick George Creed, Croydon, England, assignor to Floating Stations Limited, London, E.C.2, England, a British company Application July 11, 1944, Serial No. 544,372
In Great Britain July 1, 1943

6 Claims. (Cl. 114—43.5)

This invention relates to improvements in floating structures or vessels particularly for use in conducting salvage or similar submarine operations and other uses.

At all times diving and submarine salvage operations are an arduous task fraught with much danger. This is largely due to the necessity of having to use a surface-borne vessel which is affected both by wind and by wave movement. The employment of larger vessels mitigates but does not eliminate this disadvantage and, during rough weather, submarine salvaging or other diving operations often have to be suspended.

During inclement weather or when a heavy sea is running, it is not practicable for a diver to descend because, if his air and lifelines become too taut, he may be jerked about on account of the rising and falling of the vessel with the possibility that one or both of the lines may be severed, whilst if his lines become too slack the diver's life is imperilled should he fall an appreciable distance. Likewise, fair weather is necessary for the operation of moving a sunken vessel to shallow water and, if the weather becomes bad or a heavy sea comes up, the holding cables may snap or have to be severed, when the operation has to be commenced afresh, with serious loss in time and possibly also in material.

Now, the chief object of the present invention is to provide an inherently stable floating structure less affected by wave movements than a vessel of normal construction and which will be but little affected by wave movements even in rough weather.

The floating structure or vessel according to the present invention essentially consists of at least two submerged buoyant bodies which are horizontally arranged parallel with each other at a distance apart and at the same level, from each of which bodies extend upwardly above the surface of the sea a plurality of vertically arranged buoyant bodies whose upper ends are interconnected by a bridgework or the like to form a rigid structure.

More particularly the invention consists in a stable floating structure or vessel having but a small response to wave motion, comprising two elongated submerged hollow bodies spaced parallel to one another with their centres at a distance of some three to four times their diameter or breadth, a plurality of spaced vertically extending buoyant bodies of a size to blank out some 10 to 30 per cent of the effective upper surfaces of the horizontal bodies into which they are built, and a superstructure including transverse bridgeworks built into the upper ends of the vertical bodies to form a rigid structure. Due to the spacing of the horizontal submerged hollow bodies and their length, the structure is inherently stable.

The horizontal submerged buoyant bodies as well as the vertically arranged partly submerged buoyant bodies are preferably of circular cross-section and the former extend beyond the latter where they may be rounded or tapered off. Both the submerged and partly submerged buoyant bodies are desirably divided off into water-tight compartments and provided with longitudinally extending stiffeners. Means are provided for permitting partial flooding of any or all compartments for ballast purposes and for expelling flood or ballast water as by means of compressed air. Means of communication such as suitable passages and water-tight doors are provided throughout the structure. The superstructure which interconnects the vertical buoyant bodies includes a deck structure and contains all or most of the necessary machinery including power plant, winches and so on, but as the equipment of the vessel forms no part of the present invention details thereof need not be elaborated.

When the floating structure or vessel is in use or during inclement weather, it is partly flooded to cause the horizontal submerged buoyant bodies to sink to a lower level, say until the water level is some half-way to three-quarters way up the length of the vertical buoyant bodies. The depth to which the horizontal buoyant bodies are sunk is as near as possible to that at which complete, or substantially complete, immobility is obtained in spite of wave action.

It is well known that for each surface wave there is a corresponding sub-surface wave and that the height of the sub-surface wave diminishes as the depth increases. A generally accepted formula for finding the height of a sub-surface wave at any particular depth is as follows:

$$H' = He^{-2\pi D/L}$$

where

D = Depth at which $H'$ is measured
L = Wave length (200 ft.)
H = Height of surface wave (10 ft.)
H' = Height of sub-surface wave.

The height of a sub-surface wave is a measure of the change of head of static pressure at that depth and therefore the changes of head of pressure decrease with increase of depth. A submerged body having its upper and lower effective surfaces spaced a distance apart is subjected to a change of head of pressure on the upper and lower sides thereof, but as the upper surface is at a higher level than the under-surface it is subjected to a greater change of head of pressure on its upper surface with the result that it tends to sink as a wave rises.

An unattached partly submerged vertical buoyant body would be subjected to the head of pressure existing on the bottom surface thereof and would be lifted on the passage of a wave by an amount determined by the head of pressure of the sub-surface wave at the depth to which it extends.

In the vessel according to the present invention by combining fully submerged horizontal buoyant bodies with partly submerged vertical buoyant bodies in such a way that in eliminating the bottom of the vertical bodies enough of the effective upper surface of the submerged bodies is taken away that, for the largest waves likely to be encountered where the vessel is intended to operate, the changes of pressure on the effective upper surfaces of the horizontal bodies counterbalance as nearly as possible simultaneous but lesser changes of heads of pressure on the larger under surfaces thereof thus achieving a high degree of immobility or lack of response to wave motion.

The above statements will be appreciated from an examination of the following two tables which show the effects at different depths of waves 5 ft. and 10 ft. high and 200 ft. long acting on a submerged horizontal cylinder 20 ft. in diameter and 50 ft. long and the comparable effects on a similar horizontal cylinder provided with a vertically extending partly submerged cylinder 18.2 ft. in diameter which blocks out 26% of the effective upper surface of the horizontal cylnder.

*Table I*

[Waves 5 ft. at surface]

| 1<br>D<br>(depth in feet) | 2<br>$x(=.0314\,D)$ | 3<br>$e^{-x}$ | 4<br>$H'(=5e^{-x})$ | 5<br>Excess top pressure in tons | 6<br>Excess top pressure in tons with vert. cyl. |
|---|---|---|---|---|---|
| 5 | .157 | .8537 | 4.268 | 32.7 | 1.055 |
| 10 | .314 | .7305 | 3.652 | 28.1 | .98 |
| 15 | .471 | .6243 | 3.121 | 24 | .84 |
| 20 | .628 | .5337 | 2.668 | 20.5 | .735 |
| 25 | .785 | .4561 | 2.280 | 17.5 | .60 |
| 30 | .942 | .3898 | 1.949 | 15 | .53 |
| 35 | 1.099 | .3333 | 1.666 | 12.8 | .455 |
| 40 | 1.256 | .2847 | 1.423 | 10.9 | .37 |
| 45 | 1.413 | .2434 | 1.217 | 9.3 | .33 |
| 50 | 1.570 | .2080 | 1.040 | 8 | .27 |
| 55 | 1.727 | .1778 | .8890 | 7.1 | .185 |
| 60 | 1.884 | .1520 | .7600 | 5.7 | .068 |

$x = \dfrac{2\pi D}{200} = .0314\,D$

*Table II*

[Waves 10 ft. high at surface]

| 1<br>D<br>(depth in feet) | 2<br>$x(=.0314\,D)$ | 3<br>$e^{-x}$ | 4<br>$H'(=5e^{-x})$ | 5<br>Excess top pressure in tons | 6<br>Excess top pressure in tons with vert. cyl. |
|---|---|---|---|---|---|
| 5 | .157 | .8537 | 8.537 | 65.5 | 2.110 |
| 10 | .314 | .7305 | 7.305 | 56.2 | 1.96 |
| 15 | .471 | .6243 | 6.243 | 48 | 1.68 |
| 20 | .628 | .5337 | 5.337 | 41 | 1.47 |
| 25 | .785 | .4561 | 4.561 | 35 | 1.20 |
| 30 | .942 | .3898 | 3.898 | 30 | 1.06 |
| 35 | 1.099 | .3333 | 3.333 | 25.7 | .91 |
| 40 | 1.256 | .2847 | 2.847 | 21.9 | .74 |
| 45 | 1.413 | .2434 | 2.434 | 18.7 | .66 |
| 50 | 1.570 | .2080 | 2.080 | 16 | .54 |
| 55 | 1.727 | .1778 | 1.778 | 14.3 | .37 |
| 60 | 1.884 | .1520 | 1.520 | 11.4 | .137 |

$x = \dfrac{2\pi D}{200} = .0314\,D$

In arriving at the figures given in the above tables, the horizontal cylinder has been taken as the equivalent of a horizontal tube of parallelogram section, of which the top and bottom sides are equal to the diameter of the cylinder, and the vertical sides equal to half the diameter. The under surface is, therefore, 10 ft. deeper in the water than the upper surface and is exposed to the lesser change of head of pressure at that lower level.

The advantageous effect of blanking out part of the upper surface of the submerged body is at once apparent on comparing fifth and sixth columns of the above tables, as the effect thereof is to reduce considerably the excess pressure on the upper surface of the horizontal submerged body. By choosing an appropriate relationship of the diameter of the vertical cylinder to the dimensions of the submerged horizontal body, the excess top pressure may be adjusted, thus by increasing the diameter of the vertical column in Table II from 18.2 ft. to 18.4 ft. the excess top pressure on the same horizontal cylinder is reduced at 5 ft. from 2.110 to .9 tons
10 ft. from 1.96 to .8 tons
15 ft. from 1.68 to .77 tons
20 ft. from 1.47 to .7 tons
25 ft. from 1.20 to .54 tons
30 ft. from 1.06 to .51 tons
35 ft. from .91 to .45 tons
40 ft. from .74 to .35 tons
45 ft. from .66 to .31 tons
50 ft. from .54 to .25 tons By joining two or more of the horizontal cylinders, each with its vertically extending cylinder, to form one elongated submerged body, and by duplicating such an arrangement and interconnecting the several vertical cylinders of the two elongated submerged bodies to hold them as a rigid structure in parallel relation with their centres at a distance of about two to three times the diameter of the respective submerged bodies as called for by the present invention, the resulting structure is stable and substantially non-responsive to wave movement without requiring any stabilising devices, counter-weights, compensating movable parts and such like devices which have been provided in all previous constructions attempting to obtain stability and immobility so far as the action of the waves is concerned.

The slight effects that sub-surface waves can have on a composite structure of such dimensions as are envisaged in the preceding paragraph can only be negligible as the magnitude will be so small and slow as to fail to have appreciable effect on such a mass, except possibly to create some rhythmic movement. Rhythmic movement of the floating structure can be damped out in various ways, as by the simple expedient of anchoring the vessel with one or more tight cables (such as would not be possible with a vessel of normal construction) or by the provision of auxiliary means such as a deeply submerged horizontal plate or plates held out on hinged supports from one or both sides. Any such means, which are within the skill of anyone versed in the art to devise, are very effective as the unbalanced pressures due to any one wave or series of waves are so slight that even quite crude devices can be very effective.

The vertical buoyant bodies not only serve a useful purpose in blanking out part of the upper surface of the submerged horizontal bodies to counteract the effect of wave motion but they also provide a large reserve of buoyancy and in co-operation with the horizontal submerged bodies, due to their wide spaced relation, hold the craft stable under all conditions. The degree of reserve of buoyancy is sufficient to enable the floating structure to lift sunken vessels bodily, thus as an example, when it is desired to bring sunken vessels to shallow water, the structure is anchored astride the wreck and sunk to the maximum permissible or optimum extent when divers may place cables around underneath the wreck, or attach cables by means of hooks to port-holes or specially cut apertures in the sides, by means of which cables the sunken vessel may be raised bodily off the sea bed and even raised up into the space between the respective submerged horizontal bodies of the floating structure. Tide lift may also be utilised for assisting in lifting the wreck or in bringing it into dock or to shallow water. When the craft and wreck have been brought to shallow water with a suitable smooth, soft and level bottom, the structure may even be sunk until the horizontal bodies rest on the sea bed when the wreck may be further lifted by the holding cables until it breaks surface when it may be made self-buoyant and prepared for being floated away for repair.

Now in order that the invention may be clearly understood and readily carried into effect, an embodiment of a floating structure or vessel is hereinafter more fully described with reference to the accompanying drawings which are given for purposes of illustration only and not of limitation or definitive detail.

In these drawings:

Figure 1 is a perspective view of the floating structure shown in use in salvaging a sunken ship;

Figure 2 is a side elevation;

Figure 3 is a plan view;

Figure 4 is a section taken on the line IV—IV of Figure 3 to indicate the internal construction;

Figure 5 is an end view;

Figure 6 is a section through a vertical cylinder taken on the line VI—VI of Figure 5, and Figures 7, 8 and 9 are sections similar to Figure 6 of different sectional shapes or alternative vertical cylinders.

The floating structure illustrated in the drawings and now to be briefly described, is dimensioned for use in water where the highest waves encountered are not more than about 10 to 15 ft. high, and for raising ships of a dead weight of not more than 4,000 or 5,000 tons including cargo and fittings. The vessel comprises two horizontal submerged bodies 1, 2 each comprising a tube of about 20 ft. diameter and some 250 ft. in length. Each submerged horizontal body has extending upwardly from its upper surface five vertically extending buoyant bodies or cylinders 3, 4, 5, 6 and 7, each of some 18 ft. diameter set at approximately 50 ft. distances. The upper ends of the cylinders, 3, 4, 5, 6, 7 are interconnected and interconnected with the cylinders of the other horizontal bodies 1 and 2 parallel to one another with their centres spaced apart from 60 to 80 feet.

The dimensions quoted above are intended to be relative since the diameters of the vertically buoyant bodies or cylinders may be the same as those of the submerged horizontal bodies, but in that case there will be fewer vertical cylinders spaced further apart so as to give the desired immobility at convenient depths by blanking out an appropriate amount of the upper surfaces of the submerged horizontal bodies.

The vertical buoyant bodies 3, 4, 5, 6, 7 are subdivided by a plurality of transverse horizontal partitions 9 (see Figure 4) and reinforced vertically by vertically extending plates 10, 11, 12, 13 (see Figure 6) which intermediate the partitions 9 may carry stiffening plates between them and the inner peripheral wall of the respective cylinder 6. The submerged horizontal bodies 1, 2 are of similar construction and divided transversely by partitions 14 and by longitudinal horizontal and vertical walls 15 arranged similarly to the walls 10, 11, 12, and 13 of the vertical columns. The arrangement of the parts is such that the opposed walls 10, 12 of a vertical cylinder are built into or extended to form the transverse partitions 14, whilst the other walls 11, 13 are built into or extended to form part of the vertical walls 15, as in this way the various cylinders are not only made robust but are joined together with considerable strength and rigidity. The various partitions will be provided with water-tight doors and such like for permitting communication between the various compartments.

The superstructure 8 incorporates transverse bridgeworks 16 (see Figure 5) which are built into the upper ends of the vertical cylinders 3, 4, 5, 6, 7. The walls 10, 12 or girder stiffeners thereof are built onto the members of the bridgework. The vertical columns are also steadied by pairs of braces 17 which may also form part of the bridgework and are also built onto the walls 10, 12 or to the stiffeners thereof. An auxiliary bridgework 18 may also be provided under the superstructure to extend between the braces to give further rigidity to the construction as a whole.

The longitudinal horizontal and vertical walls of the horizontal submerged bodies form plate girders of considerable strength and the superstructure is desirably similarly made rigid by longitudinal plate girders built onto the ends of or into the transverse bridgeworks 16.

The upper and lower edges of the bridgeworks are built in to form decks 19, 20 of which the former is the upper deck for the accommodation of gear and so on, whilst the latter forms an inner deck on which may be carried machinery and so on, such as power plant 21 for driving reduction gear 22 for the winch shaft 23 for winding up the cables 24 for lifting sunken vessels and the like. The nature of the equipment, et cetera for the vessel does not form part of the invention and need not be further described here, except to mention that there will be a plurality of winches along both sides of the vessel inwardly of the buoyant bodies, when it is also desirable to provide a guard rail or fender 25 at the innermost point of each of the horizontal bodies 1, 2. It is also not proposed to detail further the internal construction of the vessel as it is capable of much modification and with the above directions could easily be designed by a naval architect.

The vertical partly submerged buoyant bodies need not be cylindrical although this shape is preferred as wind will have a reduced effect thereon, since these bodies may be of square section as shown in Figure 7, of streamline form as shown in Figure 8, or of diamond section as shown in Figure 9. Furthermore, the horizontal submerged bodies 1 and 2 need not be cylindrical since they may be of parallelogram section or any other convenient shape having effective upper and lower surfaces spaced a distance apart.

The floating structure defined above whilst being specially useful for raising sunken vessels enabling this operation to be carried out more quickly and more safely than at present and even in rough weather, is also useful as a vessel for general salvage or diving operations and similar submarine activities as it forms a stable vessel but little affected by wave motion, from which divers may descend, or diving bells or observation chambers may be lowered as well as other salvage devices such as grabs, which may be used effectively and with accuracy due to the steadiness of the vessel. The vessel may also be used for sinking piles and caissons as in the construction of piers, bridges and the like as well as many other uses such as a relay station, re-fuelling station and other such applications involving use of a floating structure which has the desirable characteristic of stability with substantial immobility or lack of response to wave motion.

The submerged horizontal cylinders and also the partly submerged vertical cylinders are, as illustrated, conveniently of uniform diameter throughout their length and uniformity of shape and size of the parts makes for economy and also ease of construction.

I claim:

1. A stable floating structure having a negligible response to wave motion, said structure comprising two similar elongated buoyant bodies completely submerged parallel to and spaced from each other in a horizontal plane below the bottom of the deepest wave trough likely to be encountered, a plurality of elongated buoyant bodies projecting vertically upwardly from the upper surfaces of said horizontal bodies to a level above the highest wave crest likely to be encountered, said vertical bodies being of uniform cross-section throughout their height, the total cross-sectional area of all the vertical bodies projecting from each one of said horizontal bodies being between 10% and 30% of the effective upper surface of the asociated horizontal body whereby said vertical bodies blank off a sufficient part of the effective upper surfaces of the horizontal bodies to balance substantially the whole difference between the heads of pressure created on the upper and lower effective surfaces, respectively, of said horizontal bodies due to the passage of a wave, and a superstructure interconnecting all said vertical bodies on said two horizontal bodies above the level of the highest wave crest likely to be encountered.

2. A floating structure, as claimed in claim 1, in which said horizontal bodies are arranged with their centres at a distance of between three and four times their breadth.

3. A floating structure, as claimed in claim 1, in which said horizontal bodies are of uniform cross-section through the greater part of their length and tapered at their ends.

4. A floating structure, as claimed in claim 1, in which said horizontal bodies are of uniform circular cross-section through the greater part of their length and rounded off at their ends.

5. A floating structure, as claimed in claim 1, in which said vertical bodies are tubes of substantially uniform circular cross-section.

6. A stable floating structure having a negligible response to wave motion, said structure comprising two buoyant bodies spaced from each other and completely submerged to a depth below the bottom of the deepest wave trough likely to be encountered, a plurality of elongated buoyant bodies projecting upwardly from the upper surfaces of said completely submerged bodies to a level above the highest wave crest likely to be encountered, said vertical bodies being of uniform cross-section throughout their height and the total cross-sectional area of all the vertical bodies projecting from each horizontal body being so proportioned as to blank out a sufficient part of the upper surface of the associated submerged body to balance substantially the whole difference between the heads of pressure created on the upper and lower surfaces respectively, of such body due to the passage of a wave, and a superstructure interconnecting all said vertical bodies on said two submerged bodies above the level of the highest wave crest likely to be encountered.

FREDERICK GEORGE CREED.